Patented Nov. 21, 1939

2,180,345

UNITED STATES PATENT OFFICE 2,180,345

CATALYST FOR MAKING ETHYL CHLORIDE

Robert D. Blue, Midland, Mich., assignor to The Dow Chemical Company, Midland, Mich., a corporation of Michigan No Drawing. Application August 29, 1936, Serial No. 98,600

4 Claims. (Cl. 23—233)

This invention concerns the preparation of a liquid catalyst composition to be used for promoting the addition reaction of ethylene with hydrogen chloride to produce ethyl chloride.

In the preparation of ethyl chloride by intimately contacting a gaseous mixture of ethylene and hydrogen chloride with a substantially anhydrous liquid medium carrying a metal chloride catalyst for the addition reaction, it has been found necessary that additional small amounts of catalyst be introduced intermittently into the reaction zone to compensate for catalyst which has been poisoned or otherwise become inactive to promote the reaction. Upon the introduction of additional catalyst the reaction mixture must be thoroughly agitated to insure even distribution of the added solid therethrough so as to avoid concentrations of catalyst in the liquid medium, which cause local overheating and polymerization of the reactants and product. By this method of carrying out the preparation of ethyl chloride, under the best conditions, generally about 5 to 20 parts by weight of ethyl chloride are produced per part of catalyst used up in the reaction.

Among the catalysts generally employed are aluminum chloride and ferric chloride, which tend to become inactive by absorption of relatively small amounts of water. They also involve occupational hazards in handling due to the tendency of such materials to give off hydrogen chloride and to irritate the skin when contacted therewith, and are disadvantageous in use because of the difficulties involved in obtaining adequate distribution of the catalyst through the reaction medium. Accordingly, among the objects of this invention are to provide: (1) a convenient way of preparing a liquid catalyst suitable for use in the above-described reaction in which the necessity of handling an anhydrous metal halide is eliminated, and (2) a liquid catalyst capable of effecting the formation of larger amounts of ethyl chloride per part of catalyst employed in the reaction than do those catalytic materials at present employed.

I have now found that an improved catalyst for the above addition reaction can be prepared by contacting a chlorinated aliphatic hydrocarbon with metallic aluminum in the presence of a relatively small amount of a substance capable of promoting reaction between the chloro-hydrocarbon and the aluminum. For example, aluminum metal, or an alloy thereof consisting substantially of aluminum, in finely divided form, e. g., as a powder, scrap turnings, or clippings, is intimately contacted with a quantity of a chlorinated aliphatic hydrocarbon and a relatively small amount of an accelerating material added thereto. The resulting mixture is then warmed to a temperature preferably about 20° C., usually below the boiling temperature of the chlorinated aliphatic hydrocarbon, for a period of time sufficient to effect the combination of at least a portion of the metal with the chlorinated hydrocarbon. The preferred temperature of reaction is dependent upon the particular chlorinated aliphatic hydrocarbon and the accelerator employed, and if said temperature is above the boiling point of the organic solvent, the reaction may be carried out under superatmospheric pressure. Any suitable reaction temperature may be employed, provided it does not cause polymerization or decomposition of the chlorinated hydrocarbon. The catalytic liquid so prepared is thereafter employed as a reaction medium or incorporated with additional chlorinated organic solvent and used as a reaction bath wherein gaseous mixtures comprising ethylene and hydrogen chloride are contacted under the usual conditions of reaction. The yields so obtained per part of aluminum used up in the reaction have been found to be many times those obtainable in the normal use of metallic halide catalysts.

The following examples illustrate the practice of my invention, but are not to be construed as limiting the same:

Example 1

1.5 grams of aluminum powder was admixed with 25 milliliters of propylene chloride and 1 drop of liquid bromine added thereto. The resulting suspension was warmed to a temperature of 50° C. under atmospheric pressure for one hour, at the end of which time the aluminum metal was substantially completely absorbed by the propylene chloride. The catalytic solution so prepared was then employed in the preparation of ethylene chloride from ethylene and hydrogen chloride, and 690 grams of ethyl chloride obtained thereby. This represents a yield of 460 parts by weight of ethyl chloride per unit weight of aluminum metal employed in the reaction.

Example 2

5 grams of aluminum turnings, 150 milliliters of ethyl chloride, and 4 drops of bromine were reacted together at a temperature of about 45° C., under the vapor pressure of the mixture, until the aluminum metal was completely taken up in the ethyl chloride. 60 grams of the resultant solution, containing approximately 2.3 grams of aluminum, was dissolved in 250 milliliters of ethylene chloride, and a gaseous mixture comprising equimolecular proportions of ethylene and hydrogen chloride passed therethrough at a rate of 3 cubic feet per hour, the temperature of the liquid catalyst being maintained at approximately 4° C. throughout. A yield of 330 grams of ethyl chloride per gram of aluminum metal present in the catalytic bath was obtained.

Example 3

The reaction product of 2.5 grams of aluminum powder, 25 milliliters of ethylene chloride, and 2 drops of bromine was employed substantially as described in Example 2, and resulted in a yield of 140 grams of ethyl chloride per gram of aluminum.

Other chlorinated aliphatic hydrocarbons may be substituted for those shown in the examples, for example, trichloroethane, tetrachloroethylene, tetrachloroethane, etc., or mixtures thereof. Representative of other accelerators capable of promoting reaction between the chloro-hydrocarbons and aluminum are iodine, chlorine, hydrochloric acid, hydrobromic acid, aluminum halides, sulphuryl chloride, antimony pentachloride, etc. Small portions of spent catalytic medium are also effective to promote said reaction. All of said accelerators contain a halogen and in the substantially anhydrous state are reactive with aluminum metal.

The use of my new catalyst in the preparation of ethyl chloride from ethylene and hydrogen chloride has, among others, the following advantages; (1) such catalyst is in liquid form and disperses quickly throughout liquid reaction media to which it may be added; (2) having little affinity for water, it is not subject to premature inactivation on prolonged storing prior to use; and (3) high yields of ethyl chloride are obtainable per pound of aluminum metal comprised therein and used up in the reaction.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method of preparing a liquid catalytic medium for use in reacting ethylene with hydrogen chloride, a step which consists in contacting a liquid chlorinated aliphatic hydrocarbon with metallic aluminum in the presence of a relatively small amount of an agent which contains a halogen and which is reactive with aluminum under substantially anhydrous condition, and is an activator for the reaction between said hydrocarbon and aluminum.

2. In a method of preparing a liquid catalytic medium for use in reacting ethylene and hydrogen chloride, the step which consists in contacting a liquid chlorinated aliphatic hydrocarbon with metallic aluminum in the presence of a relatively small amount of bromine.

3. In a method of preparing a liquid catalytic medium, the step which consists in contacting a liquid chlorinated aliphatic hydrocarbon with metallic aluminum in the presence of a relatively small amount of bromine.

4. In a method of preparing a liquid catalytic medium, the step which consists in contacting a chlorinated aliphatic hydrocarbon with metallic aluminum in the presence of a relatively small amount of an agent which contains a halogen and which is reactive with aluminum under substantially anhydrous conditions and is an activator for the reaction between said chlorinated hydrocarbon and aluminum, at a temperature above about 20° C. but below the boiling point of the chlorinated aliphatic hydrocarbon employed, under the vapor pressure of the reaction mixture at the temperature employed.

ROBERT D. BLUE.